United States Patent [19]
Kasprik et al.

[11] Patent Number: 4,479,505
[45] Date of Patent: Oct. 30, 1984

[54] HEATING VALVE

[75] Inventors: Manfred Kasprik; Paul Mintert, both of Lippstadt; Klaus Werner, Warstein, all of Fed. Rep. of Germany

[73] Assignee: Theodor Heimeier Metallwerk GmbH, Erwitte, Fed. Rep. of Germany

[21] Appl. No.: 349,624

[22] Filed: Feb. 17, 1982

Related U.S. Application Data

[63] Continuation-in-part of Ser. No. 333,124, Dec. 21, 1981, abandoned.

[51] Int. Cl.³ .............................................. F16L 55/18
[52] U.S. Cl. ..................................... 137/15; 137/315; 251/214; 29/157.1 R; 29/511; 29/520
[58] Field of Search ................... 251/214, 322; 29/520, 29/511, 157.1 R; 137/315, 15

[56] References Cited

U.S. PATENT DOCUMENTS

| | | | |
|---|---|---|---|
| 2,015,541 | 9/1935 | Weatherhead, Jr. | 29/511 |
| 3,297,054 | 1/1967 | Nielson et al. | 251/214 |
| 3,490,735 | 1/1970 | Nielson et al. | 251/214 |
| 3,772,751 | 11/1973 | Lovett | 29/520 |
| 4,111,392 | 9/1978 | Edelmunn | 251/214 |
| 4,135,546 | 1/1979 | Morrison | 251/214 |

FOREIGN PATENT DOCUMENTS

| | | | |
|---|---|---|---|
| 2042244 | 5/1973 | Fed. Rep. of Germany . | |
| 2253462 | 5/1974 | Fed. Rep. of Germany | 251/214 |
| 1044900 | 10/1966 | United Kingdom | 251/214 |

Primary Examiner—A. Michael Chambers
Attorney, Agent, or Firm—Horst M. Kasper

[57] ABSTRACT

A heating valve is provided which comprises a valve body with a plurality of connecting branches, a valve seat disposed inside the valve body, a bonnet seated in a connecting branch opposite to the valve seat, a valve stem passing through the center of the bonnet, a valve plug disposed at the end of the valve stem, a tube having an inner annular bottom extension and an inner annular top extension, with the tube surrounding the stem and pressing with its bottom against a step of the bore of the bonnet, O-rings disposed against the top face and the bottom face of the tube, a stop-ring attached to the stem holding a compression spring against the bottom of the tube and a packing nut bolted into the bonnet, surrounding the stem and pressing against the O-rings for forming seals.

10 Claims, 4 Drawing Figures

HEATING VALVE

DESCRIPTION

Cross-Reference to Related Application

This application is a continuation-in-part application of another application filed Dec. 21, 1981 and bearing Ser. No. 333,124 now abandoned.

BACKGROUND OF THE INVENTION

1. Field of the Invention

The invention relates to a heating valve where a stem passes through a packing nut, a tubular section and a bonnet for forming a seal.

2. Brief Description of the Background of the Invention Including Prior Art

Heating valves have been taught in German Patent DE-PS No. 2,042,244, where the tube is produced by hollowing out by turning of a massive rod section. Such a method of production is expensive with respect to material and labor and is therefor high-cost. In addition, the tube produced by turning out of a massive rod section is provided with only an annular bottom face, while an annular top face is formed by a pressed in stop ring. In order to avoid that the pressed in annular stop ring is pushed out again by the force of the spring, the edge of the tube toward the top is slightly inclined toward the inside. Upon screwing in of the packing nut into the bonnet the stop ring seated in a pressure fitting in the tube is pressed down further in the tube. Such a construction of the upper part of a valve has proven to be functional, however for the closing of the upper end of the tube an additional part is required in form of the stop ring.

SUMMARY OF THE INVENTION

1. Purposes of the Invention

It is an object of the present invention to provide a tube with an annular top and bottom extension to the inside such that the cutting turning process is eliminated.

It is a further object of the invention to provide a tube where it is not necessary to employ a separate stop ring as a top closure for the tube.

It is a further object of the invention to increase the effectiveness of the packing for heating valves.

These and other objects and advantages of the present invention will becomes evident form the description which follows.

2. Brief Description of the Invention

The present invention provides a heating valve which comprises a valve body having a plurality of connecting branches, a valve seat disposed inside of the valve body toward a connecting branch, a bonnet seated in a connecting branch disposed opposite to the valve seat and having an inner step bore narrowing toward the side of the valve seat, a valve stem passing through the center of the bonnet and a valve plug disposed at the end of the stem for forming together with the valve seat a closure.

A tube has an inner annular bottom extension and an inner annular top extension surrounds the stem and presses with its bottom against a step of the bore of the bonnet. A first O-ring is disposed between bonnet, the stem and the bottom of the tube. A stop ring is attached to the valve stem and disposed inside the tube. A compression spring is disposed inside the tube and pressing against the inner annular bottom extension and against the stop ring such that the valve can be shut off against the force of the compression spring. A second O-ring surrounds the stem and is disposed immediately above the inner annular top extension of the tube. A packing nut is bolted into the bonnet, surrounds the stem and provides seals by pressing against a circular lip at the upper side of the bonnet and against the second O-ring such that the tube is pressed against the first O-ring for forming a seal.

The stem, the compression spring, the stop ring and the tube can form a preassembled unit. The tube with the inner top and bottom annular rings can form a single piece. The tube can be deep-drawn from brass or can be a pressure extruded piece. The inner annular top extension of the tube can have a smaller wall thickness as compared to the remaining wall of the tube. Preferably, the inner annular top extension of the tube is deformed by turning in of the packing nut. The upper end of the tube can be enagaged concentrically by the packing nut and the packing nut can be provided with a step bore, a step of which is pressing against the tube and where the contact area of the packing nut to the tube is formed as a recess corresponding to the roll-in radius of the upper annular end of the tube. The tube can be formed by deep-drawing and the tube material of the upper end section, which is rolled in, can be weakened through ironing.

There is also provided a method for production of a valve which comprises deep-drawing a tube having an inner annular bottom extension with a center hole, inserting a compression spring into the tube and a stem through the compression ring and through the center hole, which stem has attached a stop ring for pressing against the compression spring. The upper end of the tube is rolled-in toward the stem and the lower end of the stem is passed through a hole in a bonnet having a step bore. A first O-ring is fitted between stem, tube bottom and bonnet and a plug is attached to the lower end of the stem. A packing nut presses against the upper end of the tube in part via an O-ring providing a seal between stem, upper tube end and packing nut.

A bonnet can be screwed into a valve body with the plug being positioned for engaging the valve seat. A seal lip of the bonnet can be disposed near the tube for engaging a collar of the packing ring for forming a seal. The upper end of the tube can be ironed before rolling in for stretching. The area where the tube is rolled-in toward the stem can be weakened beforehand.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which is shown one of the various possible embodiments of the present invention.

DESCRIPTION OF INVENTION AND PREFERRED EMBODIMENT

Figure 1:
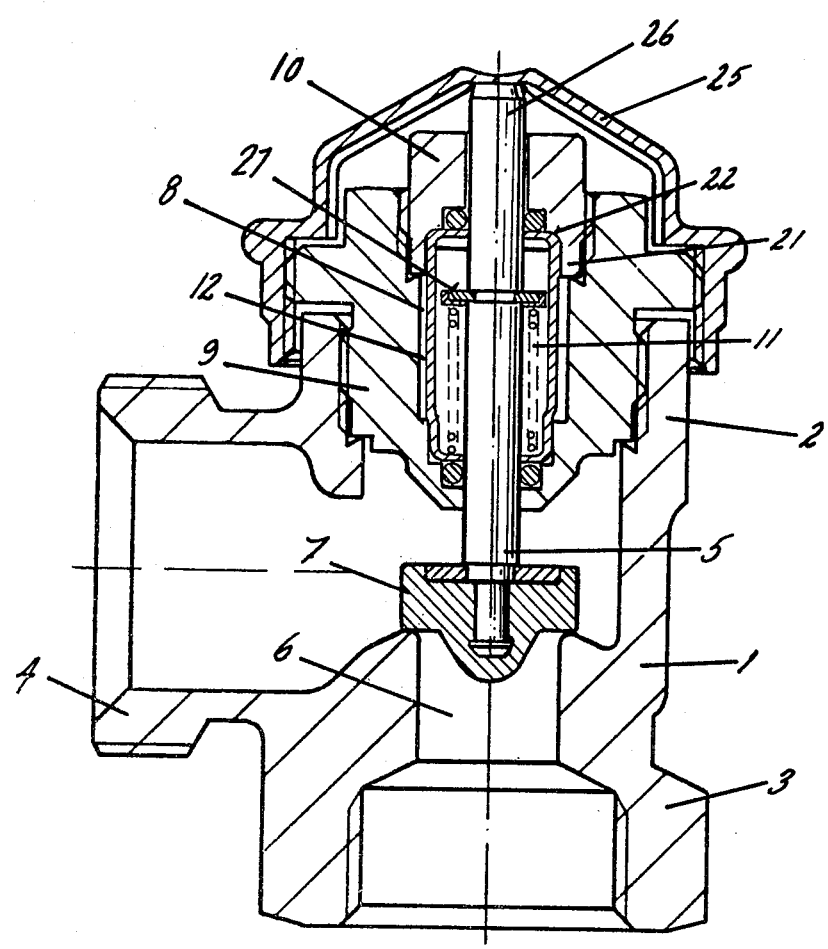
FIG. 1 is a sectional view through the center of a heating valve.
Figure 2:
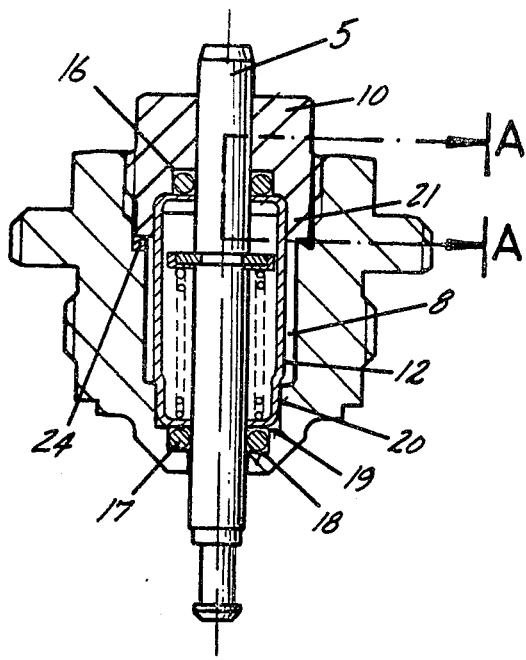
FIG. 2 is a sectional view through the center of the upper valve part.
Figure 4:
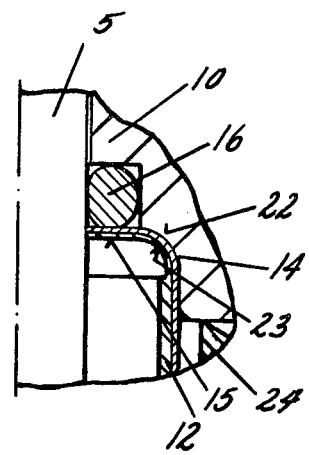
FIG. 4 is a partial sectional view along section line A—A of FIG. 2 through the end of the tube toward the cover side and the packing nut.
Figure 3:
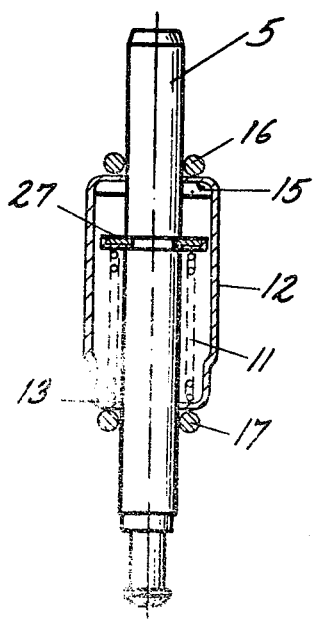
FIG. 3 is a sectional view of the stem, spring, tube and the upper and lower O-ring in the premounted state.

In accordance with the present invention there is provided a heating valve comprising:

(a) a valve body (1) with several connecting branches (2, 3, 4);

(b) one of the connecting branches (3) can be closed with a valve plug (7);

(c) a valve upper part is set into the oppositely disposed connecting branch (2);

the upper valve part comprises:

(d) a bonnet (9) provided with a step bore (8) narrowing in the direction of the valve plug (7), (e) a packing nut (10) closing the step bore (8) on the side disposed opposite to the valve pluge (7), (f) a stem (5) passing through the bonnet (9) and the packing nut (10) and at the lower end of the stem being disposed the valve plug (7) and on the upper end of the stem there acts a set member such as a handle, (g) a spring (11) disposed in the bonnet (9), surrounding the stem (5) and resting against a stop ring (27) and the stem (5) can be moved against the force of the spring (11) in closing direction, (h) a tube (12) surrounding the spring (11) and provided with an annular bottom (13) and top (15) face, and the tube is pressed by the packing nut (10) against a step (19) at the lower end of the step bore (8), (i) a first O-ring (17) surrounds the stem (5) and rests on a step (18) of the step bore (8) and is pressed together by the bottom face (13) of the tube, (k) a second O-ring (16) surrounds the stem at a step of the step bore in the packing nut (10) and is pressed together by the cover face of the tube (12)

(l) the stem (5), the spring (11) and the tube (12) are provided as a preassembled unit, which heating valve is characterized in that the tube (12) provided with a bottom face (13) is produced in a deepdrawing process or by a pressure extruding process and the annular cover face (15) is formed after the insertion of the stem (5) and of the spring (11) by rolling-in.

In order to keep the roll-in force as low as possible the end section to be rolled-in of the tube is provided with a lower wall thickness compared to the remainder region of the tube.

The heating valve taught in German Patent DE-PS No. 2,042,244 provides the possibility to balance production caused longitudinal tolerances in length by pressing of the stop ring into the tube at the screwing in of the packing nut. This advantage is maintained in the heating valve according to the present invention by allowing the tube to become slightly shortened in its length by screwing in of the packing nut up to its stop. This occurs by further rolling-in of the cover side end of the tube by the packing nut. For this reason, the pressure surface is provided as a groove corresponding to the roll-in radius of the tube. This groove provides for an additional rolling-in of the coverside tube edge upon turning of the packing nut.

The valve body 1 is provided with two oppositely disposed connecting branches 2, 3 as well as an additional connecting branch 4. The upper part accepting the axially movable stem 5 is screwed into the connecting branch 2, while the connecting branches 3 and 4 serve to provide a screw on connection for the feed and exit lines. The valve opening 6 inserted into the connecting branch 3 can be closed by the valve plug 7 attached to the end of the stem 5 protruding into the valve body 1.

The valve upper part substantially comprises the bonnet 9 having a step bore 8 and which bonnet 9 is screwed into the connecting branch 2, the packing nut 10 screwed into the step bore 8, the stem 5 going through the bonnet 9 and the packing nut 10, the compression spring 11 disposed on the stem and the tube surrounding the spring 11.

The tube 12 comprises soft brass and is formed from a circular blank by deep drawing. The tube open to the top cover has a hole in the bottom floor side face 13, and the end section 14 of the top cover side is weakened in the wall thickness by ironing. The stem 5 together with the stop ring 27 and the compression spring 11 are inserted into the tube. Then the end section of the tube at the cover side 14 is rolled in such that an inner annular top extension is produced. An O-ring 16 or respectively 17 are slid onto the stem 5 from either side up to the top extension face 15 or the bottom face 13 to contact the same. This premounted unit 5, 11, 12, 13, 15, 16 is inserted into the step bore 8 of the bonnet 9. There the O-ring 17 is placed onto the lowest step 18 of the step bore 8, while the bottom face 13 of the tube 12 rests on the second step 19 from the bottom of the step bore 8. The wall section 20 above the step 19 centers the tube 12 in the bonnet 9. The packing nut 10 is placed onto the end of the stem 5 disposed remote from the valve plug 7 and the packing nut 10 is screwed into the bonnet 9. Thereby the collar 21 of the packing nut 10 centers the cover side end of the tube 12. Upon further screwing in of the packing nut 10, the packing nut 10 comes to rest at the groove 22 on the roll-in radius 23 of the rolled-in cover face 15. If the packing nut 10 in this position does not yet sealingly contact the sealing lip 24 of the bonnet 9, then the cover side end of the tube is further rolled-in upon further turning of the packing nut 10. Thereby the manufacturing tolerances of the length of the tube 12 are balanced. This balancing of the longitudinal tolerance of the tube 12 is important since both the bottom face 13 of the tube rests against the step 19 of the bonnet 9 as well as against the flame or roll radius 22 of the packing nut 10 in order to compress the two O-rings 16, 17. By way of this cooperation the two O-rings obtain the proper pressure effect.

The valve plug 7 has to be positively attached to the end of the stem 5 before the screwing in of the bonnet 9 into the connecting branch 2. After screwing in of the bonnet 9 the handle cap 25 is bolted over the same and the handle cap actuates the end 26 of the stem 5.

Preferably the diameter of the tube 12 is from about two to three times the diameter of the stem. Preferably the diameter of the tube is from about 15 to 25 times the thickness of the longitudinal wall of the tube. Preferably the wall thickness of the tube at the upper ironed end is from about 0.7 to 0.9 of the wall thickness at the longitudinal side. The diameter of the stem can be preferably from 3 to 5 mm. The O-rings are preferably made from ethylene-propylene-terpolymer (EPDM).

The chemical composition of the tube can comprise from about 70 to 74 weight percent copper and preferably from about 71 to 73 weight percent copper and from 26 to 30 weight percent zinc and preferably from 27 to 29 weight percent zinc. The microstructure of the deep drawn tube comprises fine grains. Individual grains can have a grain size of about 30 microns. The grains are elongated in the direction of the drawing process induced flow. This results in a hight strength.

The present invention with the rolled tube 12 provides the advantage of easy exchange of the O-rings 16 and 17 and providing sufficient contact pressure for the O-rings. Furthermore, the tube 12 drawn in accordance with the present invention exhibits at the same wall thickness a higher strength (10 to 30 percent higher) and less cracks as compared with conventional valve tubes. It will be understood that each of the elements described above, or two or more together, may also find a useful application in other types of system configurations and valve and heating control procedures differing from the types addressed above.

While the invention has been illustrated and described as embodied in a heating valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A heating valve comprising
   a valve body having a plurality of connecting branches;
   a valve seat disposed inside the valve body toward a connecting branch;
   a bonnet seated in a connecting branch disposed opposite to the valve seat and having an inner step bore narrowing toward the side of the valve seat;
   a valve stem passing through the center of the bonnet;
   a valve plug disposed at the end of the stem for forming together with the valve seat a closure;
   a tube having an inner annular bottom extension and an inner annular top extension formed as a single piece, the tube surrounding the stem and pressing with its bottom against a step of the bore of the bonnet;
   a first O-ring disposed between the bonnet, the stem and the bottom of the tube;
   a stop ring attached to the stem and disposed inside the tube;
   a compression spring disposed inside the tube and pressing against the inner annular bottom extension and against the stop ring such that the valve can be shut off against the force of the compression spring, where the stem, the stop ring, the compression spring and the tube form a preassembled unit;
   a second O-ring surrounding the stem and disposed immediately above the inner annular top extension of the tube rolled-in toward the stem;
   a packing nut bolted into the bonnet, surrounding the stem, providing seals by pressing against a circular lip at the upper side of the bonnet, and having a small diameter inner stepped bore for pressing against the second O-ring such that the second O-ring is pressed against the inner annular top extension of the rolled-in tube and against the stem for forming a seal and having a step bore providing a second larger diameter inner recess matching the rolled-in radius of the upper annular end of the tube and providing a contact area of the packing nut with the upper annular end of the tube; and
   wherein the upper end of the tube is engaged concentrically by the packing nut, the inner annular top extension of the tube is deformed by turning in of said packing nut with the step bore pressing against the tube such that the tube coacting with the packing nut is pressed against the first O-ring for forming a seal.

2. The heating valve according to claim 1 wherein the tube is a deep-drawn piece of brass.

3. The heating valve according to claim 1 wherein the tube is a pressure extruded piece.

4. The heating valve according to claim 1 wherein the inner annular top extension of the tube has a smaller wall thickness as compared to the remaining tube wall.

5. The heating valve according to claim 1 wherein the tube is formed by deep-drawing and where the tube material of the upper end section rolled-in is weakened through ironing.

6. A method for production of a valve comprising
   deepdrawing a tube having an inner annular bottom extension with a center hole;
   inserting a compression spring into the tube;
   inserting a stem through the compression spring and through the center hole, which stem has attached a stop ring for pressing against the compressions ring;
   rolling-in the upper end of the tube toward the stem;
   passing the lower end of the stem through a hole in a bonnet having a step bore;
   fitting a first O-ring between stem, tube bottom and bonnet; attaching a plug to the lower end of the stem;
   pressing against the upper end of the tube with a packing nut and with a second O-ring providing a seal between stem, upper tube and packing nut, where the packing nut has a smaller diameter deeper recess for matching a second O-ring and has a concentric larger diameter less deep recess for matching and coacting with a resulting rolled-in edge of the tube such that the tube coacting with the packing nut is pressed against the first O-ring for forming a seal.

7. The method for production of a valve according to claim 6 further comprising
   screwing the bonnet into a valve body with the plug positioned for engaging the valve seat.

8. The method for production of a valve according to claim 6 further comprising
   engaging a seal lip of the bonnet disposed near the tube with a collar of the packing ring for forming a seal.

9. The method for production of a valve according to claim 6 further comprising
   ironing the upper end of the tube before rolling-in.

10. The method for production of a valve according to claim 6 further comprising
    weakening the area where the tube is to be rolled-in toward the stem.

* * * * *

UNITED STATES PATENT AND TRADEMARK OFFICE
CERTIFICATE OF CORRECTION

PATENT NO. : 4,479,505

DATED : October 30, 1984

INVENTOR(S) : Manfred Kasprik, et al.

It is certified that error appears in the above-identified patent and that said Letters Patent is hereby corrected as shown below:

```
On the title page insert:
--(30) Claim Priority Application Data
   Germany         3,048,308              Dec. 20, 1980
                                                         --.
```

Signed and Sealed this

First Day of October 1985

[SEAL]

Attest:

DONALD J. QUIGG

Attesting Officer

Commissioner of Patents and
Trademarks—Designate